United States Patent
Lu et al.

(10) Patent No.: US 9,372,578 B2
(45) Date of Patent: Jun. 21, 2016

(54) DETECTION METHOD AND DEVICE FOR TOUCH POINT, TOUCH DRIVING CIRCUIT, AND TOUCH SCREEN

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Youqiang Lu, Beijing (CN); Yun Qiu, Beijing (CN); Jing Wang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 14 days.

(21) Appl. No.: 14/357,935

(22) PCT Filed: Dec. 13, 2013

(86) PCT No.: PCT/CN2013/089333
§ 371 (c)(1),
(2) Date: May 13, 2014

(87) PCT Pub. No.: WO2014/206027
PCT Pub. Date: Dec. 31, 2014

(65) Prior Publication Data
US 2015/0277659 A1 Oct. 1, 2015

(30) Foreign Application Priority Data
Jun. 28, 2013 (CN) .......................... 2013 1 0269693

(51) Int. Cl.
*G06F 3/041* (2006.01)

(52) U.S. Cl.
CPC .............. *G06F 3/0418* (2013.01); *G06F 3/041* (2013.01)

(58) Field of Classification Search
CPC .................. G06F 3/04883; G06F 2203/04804; G06F 3/017; G06F 3/0481; G06F 3/0412; G06F 3/044; G06F 3/0488; G06F 3/011; G06F 3/0416; G06F 3/0418; G06F 3/0482; G06F 3/04886; G06F 11/1443; G06F 11/1474; G06F 3/041; G06F 2203/04106; G06F 3/02; G06F 3/046; G06F 2203/04104; G06F 2203/04103; G06F 2203/04107; G06F 2203/04111; G09G 2320/0257; G09G 2340/16; G09G 3/34; G09G 3/344; G09G 3/3629; G09G 2300/0426; G09G 2320/028; G09G 2354/00; G09G 2360/144; G09G 3/3648; G09G 3/3655; G09G 5/00; G09G 5/38
USPC ................................... 345/173–181
See application file for complete search history.

(56) References Cited

U.S. PATENT DOCUMENTS 8,730,189 B2 * 5/2014 Mamba et al. ................ 345/173
8,976,123 B2 * 3/2015 Noguchi et al. .............. 345/173
(Continued)

FOREIGN PATENT DOCUMENTS

CN 101893957 A 11/2010
CN 103019495 A 4/2013
(Continued)

OTHER PUBLICATIONS
International Search Report mailed Mar. 27, 2014; PCT/CN2013/089333.
(Continued)

*Primary Examiner* — Duc Dinh
(74) *Attorney, Agent, or Firm* — Ladas & Parry LLP (57) ABSTRACT

The present invention discloses a touch point detection method, device, a touch driving circuit and a touch panel. After determining a to-be-determined touch point among touch detection points of a touch panel, it is determined whether the to-be-determined touch point is influenced by noise of a display driving circuit according to a touch signal, a first noise value and a second noise value of touch detection points in a line where the to-be-determined touch point is located; and after it is determined that the to-be-determined touch point is influenced by the noise of the display driving circuit, it is determined whether the to-be-determined touch point is a touch point according to the second noise value and a preset first threshold value; the second noise value is the noise value of the touch driving circuit when the display driving circuit is turned on. Because it is determined whether the to-be-determined touch point is influenced by the noise of the display driving circuit before determining whether it is a touch point, it is possible to effectively identify interference of noise on the touch signals, improve signal-to-noise ratio of touch signals, and ensure accuracy of touch determining operation.

20 Claims, 4 Drawing Sheets

(56) References Cited

U.S. PATENT DOCUMENTS

2008/0218648 A1    9/2008  Koshihara et al.
2009/0184934 A1*   7/2009  Lin et al. .................... 345/173
2010/0295824 A1    11/2010 Noguchi et al.
2012/0249476 A1*   10/2012 Schwartz et al. ............. 345/174
2013/0321332 A1*   12/2013 Yoshimura .................... 345/174

FOREIGN PATENT DOCUMENTS

CN    103365469 A    10/2013
EP      1821175 A1    8/2007

OTHER PUBLICATIONS

I First Chinese Office Action dated Sep. 6, 2015; Appln. No. 201310269693.X.

Second Chinese Office Action Appln. No. 20130263639.x; Dated Nov. 19, 2015.

International Preliminary Report on Patentability Appln. No. PCT/CN2013/089333; Dated Dec. 29, 2015.

* cited by examiner

|     | X1 | X2 | X3 | X4 | X5 | X6 | X7 | X8 | X9 | X10 |
|-----|----|----|----|----|----|----|----|----|----|-----|
| Y1  | 0  | 1  | 1  | 2  | 0  | 1  | 1  | 2  | 1  | 2   |
| Y2  | 1  | 1  | 2  | 1  | 2  | 1  | 1  | 2  | 1  | 2   |
| Y3  | 0  | 1  | 2  | 1  | 2  | 1  | 1  | 2  | 1  | 2   |
| Y4  | 0  | 1  | 1  | 2  | 0  | 1  | 1  | 2  | 1  | 2   |
| Y5  | 1  | 1  | 2  | 1  | 2  | 1  | 1  | 2  | 1  | 2   |
| Y6  | 0  | 1  | 2  | 1  | 2  | 1  | 1  | 2  | 1  | 2   |
| Y7  | 20 | 19 | 19 | 20 | 19 | 18 | 19 | 20 | 19 | 20  |
| Y8  | 0  | 1  | 1  | 2  | 0  | 1  | 1  | 2  | 1  | 2   |
| Y9  | 1  | 1  | 2  | 1  | 2  | 1  | 1  | 2  | 1  | 2   |
| Y10 | 0  | 1  | 2  | 1  | 2  | 1  | 1  | 2  | 1  | 2   |
| Y11 | 0  | 1  | 1  | 2  | 0  | 1  | 1  | 2  | 1  | 2   |
| Y12 | 1  | 1  | 2  | 1  | 2  | 1  | 1  | 2  | 1  | 2   |
| Y13 | 0  | 1  | 2  | 1  | 2  | 1  | 1  | 2  | 1  | 2   |
| Y14 | 0  | 1  | 1  | 2  | 0  | 1  | 1  | 2  | 1  | 2   |
| Y15 | 1  | 1  | 2  | 1  | 2  | 1  | 1  | 2  | 1  | 2   |
| Y16 | 0  | 1  | 2  | 1  | 2  | 1  | 1  | 2  | 1  | 2   |

DETECTION METHOD AND DEVICE FOR TOUCH POINT, TOUCH DRIVING CIRCUIT, AND TOUCH SCREEN

TECHNICAL FIELD

The present invention relates to the technology field of touch screen, particularly to a detection method and a detection device for touch point, a touch driving circuit and a touch screen.

BACKGROUND

With the rapid development of display technology, touch screen panels have become popular in people's life. At present, touch panels can be classified according to their constitution structures into add-on mode touch panels, on-cell touch panels and in-cell touch panels. For an add-on mode touch panel, the touch panel and the liquid crystal display (LCD) are produced separately and then attached together to form a liquid crystal display with touch function. For an on-cell touch panel, a touch component is directly manufactured on a side of the color filter substrate of the liquid crystal display opposite to the liquid crystal layer. With respect to the add-on mode touch panel, the on-cell touch panel can reduce the thickness of the entire touch panel and increase light transmission rate.

Generally, the touch component in an on-cell touch panel consists of a plurality of touch detection points arranged in a matrix. In performing a touch operation, the touch driving circuit in the touch panel will charge and scan, namely load scanning signals to, these touch detection points line by line, and acquire touch signals from respective touch detection points in sequence; the touch driving circuit determines whether the touch detection points are touch points by comparing magnitudes of touch signals with a touch threshold value; and the touch driving circuit reports to the system for conducting a corresponding operation after determining the touch point(s).

While the touch driving circuit is detecting touch, the display driving circuit in the touch panel drives the display panel to display normally. In general, the refresh frequency for the display driving circuit in the touch panel is generally about 60 Hz, and the refresh frequency for the touch driving circuit is generally about 90 Hz, thus they are different frequencies. Noise will be generated during the refreshing operation of the display driving circuit, and the noise has a frequency consistent with the refresh frequency. The noise would interfere with the touch signals acquired by the touch driving circuit, reduce signal-to-noise ratio of the touch signals, hence influencing accuracy of the touch determining operation by the touch driving circuit.

SUMMARY

Embodiments of the present invention provide a detection method and device of touch points, a touch driving circuit and a touch panel for improving accuracy of touch determining operation in the touch panel.

A touch point detection method provided in an embodiment of the present invention includes: determining a to-be-determined touch point among touch detection points of a touch panel; determining whether the to-be-determined touch point is influenced by noise of a display driving circuit according to a touch signal, a first noise value and a second noise value of touch detection points in a line where the to-be-determined touch point is located; wherein the first noise value is a noise value of the touch driving circuit when the display driving circuit is not turned on, and the second noise value is a noise value of the touch driving circuit when the display driving circuit is turned on; upon determining that the to-be-determined touch point is influenced by the noise of the display driving circuit, determining whether the to-be-determined touch point is a touch point according to the second noise value and a preset first threshold value; the first threshold value is greater than the first noise value and smaller than the second noise value.

A touch point detection device provided in an embodiment of the present invention includes: a first determining module configured for determining a to-be-determined touch point among touch detection points of a touch panel; a second determining module configured for determining whether the to-be-determined touch point is influenced by noise of a display driving circuit according to a touch signal, a first noise value and a second noise value of touch detection points in a line where the to-be-determined touch point is located; wherein the first noise value is a noise value of the touch driving circuit when the display driving circuit is not turned on, and the second noise value is a noise value of the touch driving circuit when the display driving circuit is turned on; a third determining module configured for, upon determining that the to-be-determined touch point is influenced by the noise of the display driving circuit, determining whether the to-be-determined touch point is a touch point according to the second noise value and a preset first threshold value; the first threshold value is greater than the first noise value and smaller than the second noise value.

A touch driving circuit provided in an embodiment of the present invention includes the above-mentioned touch point detection device provided in an embodiment of the present invention.

A touch panel provided in an embodiment of the present invention includes a display driving circuit and a touch driving circuit; the display driving circuit is configured to send a synchronization signal to the touch driving circuit after displaying a set number of frames of images; the touch driving circuit is configured to detect a first noise value of the touch driving circuit when the display driving circuit is not turned on; after receiving the synchronization signal sent by the display driving circuit, detect a second noise value of the touch driving circuit when the display driving circuit is turned on; determine the to-be-determined touch point among touch detection points of the touch panel; determine whether the to-be-determined touch point is influenced by noise of the display driving circuit according to the touch signals, the first noise value and the second noise value of the touch detection points in the line where the to-be-determined touch point is located; upon determining that the to-be-determined touch point is influenced by noise of the display driving circuit, determine whether the to-be-determined touch point is a touch point according to the second noise value and a preset first threshold value; wherein the first threshold value is greater than the first noise value and smaller than the second noise value.

With the touch point detection method, device, the touch driving circuit and the touch panel provided in the embodiments of the present invention, after determining a to-be-determined touch point among touch detection points of the touch panel, it is determined whether the to-be-determined touch point is influenced by noise of the display driving circuit according to a touch signal, a first noise value and a second noise value of touch detection points in a line where the to-be-determined touch point is located; and after it is determined that the to-be-determined touch point is influenced by the noise of the display driving circuit, it is determined whether the to-be-determined touch point is a touch point according to the second noise value and a preset first threshold value; wherein the second noise value is the noise value of the touch driving circuit when the display driving circuit is turned on. Because it is determined whether the to-be-determined touch point is influenced by the noise of the display driving circuit before determining whether it is a touch point, it is possible to effectively identify interference of the noise on the touch signals, improve signal-to-noise ratio of touch signals, and ensure accuracy of touch determining operation.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms such as "a," "an," and the like are not intended to limit the amount, but indicate the existence of at least one. The terms "comprises," "comprising," "includes," "including," and the like are intended to specify that the elements or the objects stated before these terms encompass the elements or the objects and equivalents thereof listed after these terms, but do not preclude the other elements or objects. The phrases "connect," "connected," and the like are not intended to define a physical connection or mechanical connection, but may include an electrical connection, directly or indirectly. Terms such as "on," "under," "right," "left" and the like are only used to indicate relative position relationship, and when the position of the object which is described is changed, the relative position relationship may be changed accordingly.

Examples of the touch point detection method, device, the touch driving circuit and the touch panel provided in the embodiments of the present invention will be described in detail below with reference to the accompanying drawings.

Figure 1:
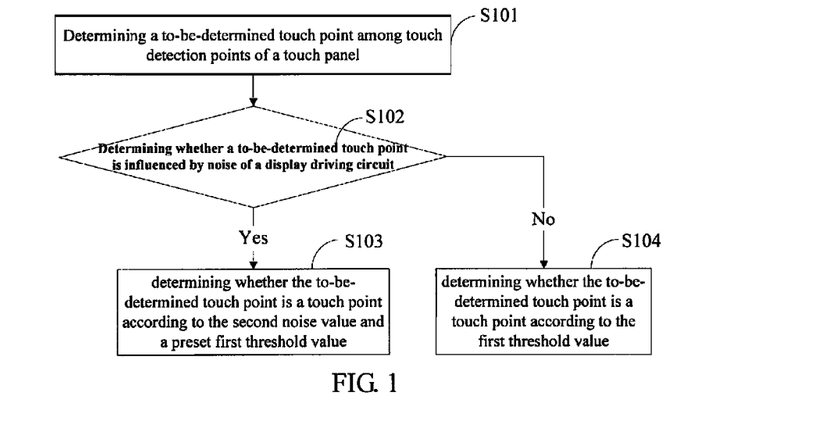
FIG. 1 is a first flow chart of a touch point detection method provided in an embodiment of the present invention.

As illustrated in FIG. 1, a touch point detection method provided in an embodiment of the present invention includes the following steps:

S101. Determining a to-be-determined touch point among touch detection points of a touch panel;

S102. Determining whether a to-be-determined touch point is influenced by noise of a display driving circuit according to a touch signal, a first noise value and a second noise value of the touch detection points in a line where the to-be-determined touch point is located; wherein the first noise value is the noise value of the touch driving circuit when the display driving circuit is not turned on, and the second noise value is the noise value of the touch driving circuit when the display driving circuit is turned on;

S103. Upon determining that the to-be-determined touch point is influenced by the noise of the display driving circuit, determining whether the to-be-determined touch point is a touch point according to the second noise value and a preset first threshold value; the first threshold value being greater than the first noise value and smaller than the second noise value.

Furthermore, as illustrated in FIG. 1, the above-mentioned detection method further includes the following step:

S104. Upon determining that the to-be-determined touch point is not influenced by noise of the display driving circuit, determining whether the to-be-determined touch point is a touch point according to the first threshold value.

With the above-mentioned touch point detection method provided in an embodiment of the present invention, because it is determined whether the to-be-determined touch point is influenced by the noise of the display driving circuit prior to determining whether the to-be-determined touch point is a touch point, it is possible to effectively identify interference of the noise on the touch signals, improve signal-to-noise ratio of touch signals, and ensure accuracy of touch determining operation.

Implementations of steps in the touch point detection method provided in an embodiment of the present invention will be described in detail below.

Figure 2:
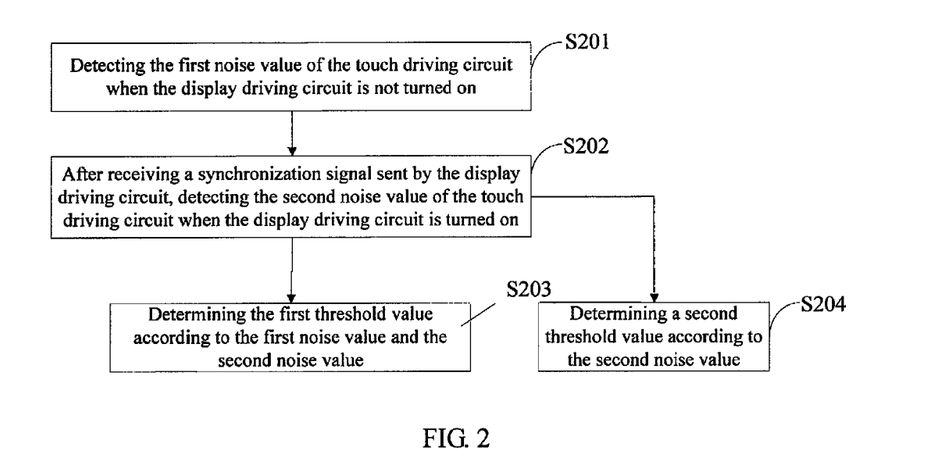
FIG. 2 is a second flow chart of a touch point detection method provided in an embodiment of the present invention.

For example, in the touch point detection method provided in an embodiment of the present invention, before step S101, namely before determining the to-be-determined touch point among the touch detection points of the touch panel, the following steps as illustrated in FIG. 2 may be further conducted:

S201. Detecting the first noise value of the touch driving circuit when the display driving circuit is not turned on.

In implementation, it is possible to turn on the touch driving circuit at first when the touch panel is turned on, the touch driving circuit goes through self-inspection after being turned on, records the initial touch signal value of each touch detection point, set the maximum value as the first noise value and stores the determined first noise value in the memory for future use. After completion of the self-inspection of the touch driving circuit, the display driving circuit is turned on to display the first frame of image. The display driving circuit sends a synchronization signal to the touch driving circuit after refreshing the first frame, and the touch driving circuit implements respective operations according to the received synchronization signal.

S202. After receiving a synchronization signal sent by the display driving circuit, detecting the second noise value of the touch driving circuit when the display driving circuit is turned on.

Figure 3:
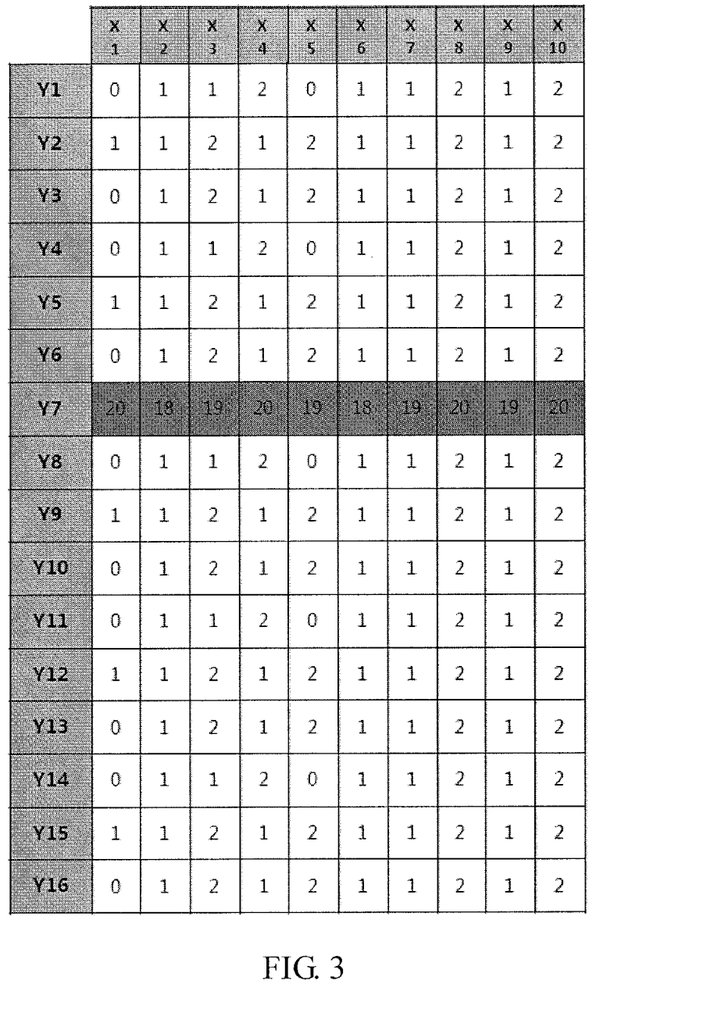
FIG. 3 is a schematic diagram of detected touch signal values of touch detection points provided in an embodiment of the present invention.

For example, the touch driving circuit detects the values of the touch signals of touch detection points again after receiving the synchronization signal sent by the display driving circuit. As illustrated in FIG. 3, among the detected touch signal values of the touch detection points, there may be a certain line having larger values, which occurs due to the noise generated when the display driving circuit refreshes frames of an image. The maximum value of them is set as the second noise value and the determined second noise value is stored in the memory for future use.

S203. Determining the first threshold value according to the first noise value and the second noise value.

For example, the first threshold value should be greater than the first noise value and smaller than the second noise value. Upon implementation, the first threshold value may be set according to actual requirement, which is not described in detail here.

Furthermore, after S202 for determining the second noise value is performed, as illustrated in FIG. 2, the following steps may be further included:

S204. Determining a second threshold value according to the second noise value, wherein the second threshold value should be greater than the second noise value, and in subsequent steps, the to-be-determined touch point is determined from the touch detection points according to the second threshold value.

Figure 4:
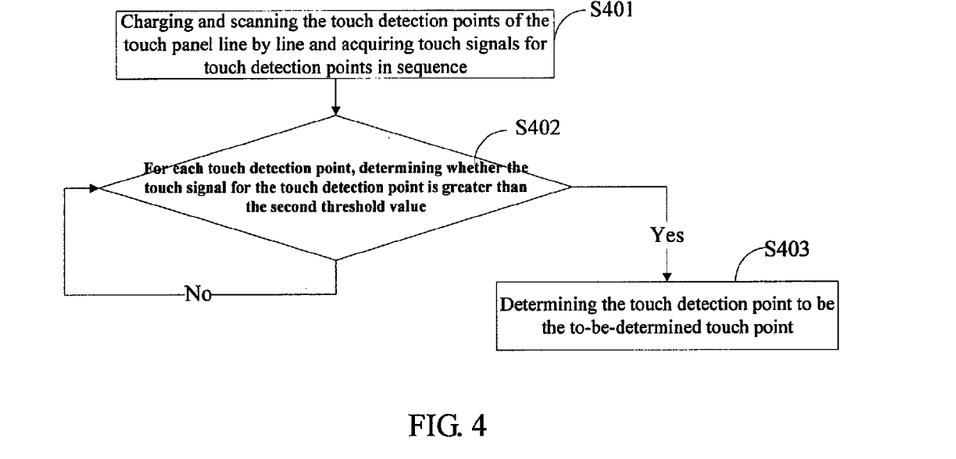
FIG. 4 is a third flow chart of a touch point detection method provided in an embodiment of the present invention.

For example, step S101 in the touch point detection method provided in an embodiment of the present invention, namely determining the to-be-determined touch point among touch detection points in the touch panel, may be implemented by the following steps as illustrated in FIG. 4:

S401. Charging and scanning the touch detection points of the touch panel line by line and acquiring touch signals for touch detection points in sequence.

S402. For each touch detection point, determining whether the touch signal for the touch detection point is greater than the second threshold value; and when determining the touch signal for the touch detection point is greater than the second threshold value, carrying out step S403; if not, returning to step S402;

S403. Determining the touch detection point to be the to-be-determined touch point.

The to-be-determined touch point may be determined from the touch detection points through the above-mentioned steps S401-S403. The touch driving circuit does not report to the system after determining the to-be-determined touch point and it is required to further determine whether the to-be-determined touch point is obtained due to the mis-determination caused by the noise of the display driving circuit. Upon implementation, it is also possible to determine the to-be-determined touch point from the touch detection points with other known methods other than the above-mentioned steps S401-S403, which will not be described in detail here.

Figure 5:
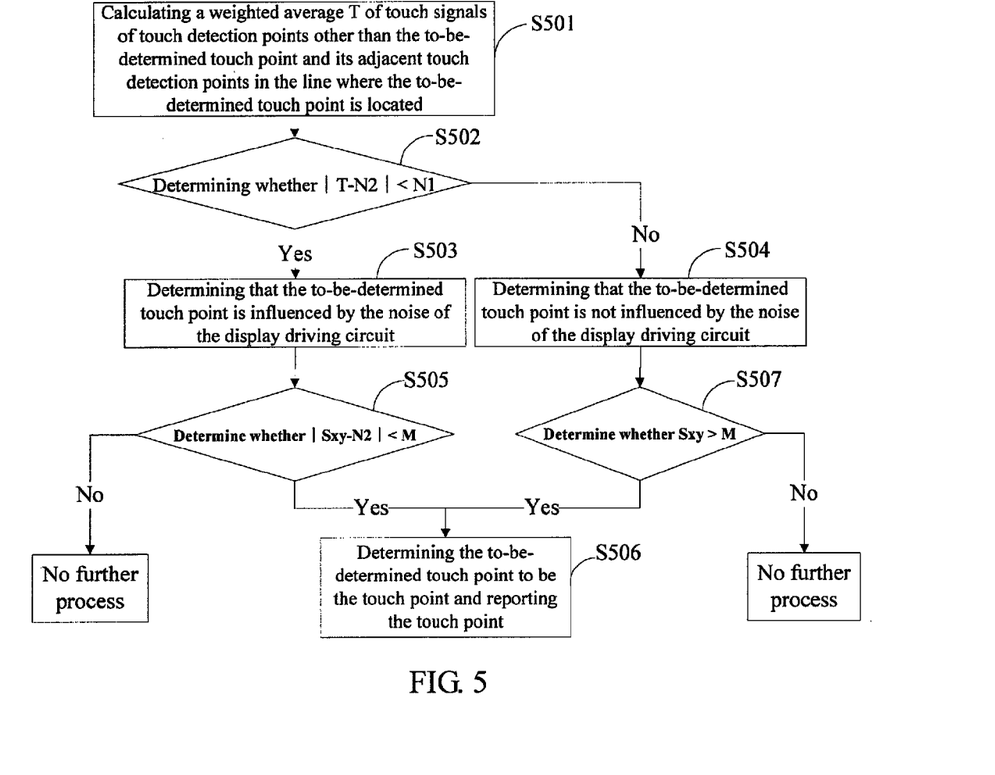
FIG. 5 is a fourth flow chart of a touch point detection method provided in an embodiment of the present invention.

For example, in the touch point detection method provided in an embodiment of the present invention, after determining the to-be-determined touch point, step S102 is carried out, namely determining whether the to-be-determined touch point is influenced by the display driving circuit. The step S102 may be implemented by the following steps as illustrated in FIG. 5:

S501. Calculating a weighted average T of touch signals of touch detection points other than the to-be-determined touch point and its adjacent touch detection points in the line where the to-be-determined touch point is located.

For example, because when a finger touches a certain to-be-determined touch point on the touch panel, touch signals for its adjacent touch detection points will vary also, touch detection points adjacent to the to-be-determined touch point are excluded in calculating the weighted average.

S502. Determining whether the absolute value of the difference between the weighted average T and the second noise value N2 is smaller than the first noise value N1; if so, carrying out step S503; if not, carrying out step S504;

S503. Determining that the to-be-determined touch point is influenced by the noise of the display driving circuit, for example at the location (x4, y7) in FIG. 3.

S504. Determining that the to-be-determined touch point is not influenced by the noise of the display driving circuit, for example at the location (x4, y4) in FIG. 3.

It is possible to determine whether the to-be-determined touch point is influenced by the noise of the display driving circuit through the above-mentioned steps S501-S504. Upon implementation, it is also possible to determine whether the to-be-determined touch point is influenced by the noise of the display driving circuit with other known methods and procedures other than the above-mentioned steps S501-S504, which will not be described in detail here.

For example, in the touch point detection method provided in an embodiment of the present invention, when it is determined that the to-be-determined touch point is influenced by the noise of the display driving circuit, determining whether the to-be-determined touch point is a touch point includes the following steps as illustrated in FIG. 5:

S505. Determining whether the absolute value of the difference between touch signals Sxy of the to-be-determined touch point and the second noise value N2 is greater than the first threshold value M; if so, carrying out step S506; if not, no processing being conducted.

S506. Determining the to-be-determined touch point to be the touch point and reporting the touch point.

In the above-mentioned step S505, after determining that the to-be-determined touch point is influenced by the noise of the display driving circuit, after removing the noise of the display driving circuit in the touch signal for the to-be-determined touch point, determining touch occurs for the to-be-determined touch point for the last time may increase accuracy of touch determination.

For example, in the touch point detection method provided in an embodiment of the present invention, when it is determined that the to-be-determined touch point is not influenced by the noise of the display driving circuit, determining whether the to-be-determined touch point is the touch point includes the following steps as illustrated in FIG. 5:

S507. Determining whether the touch signal Sxy for the to-be-determined touch point is greater than the first threshold value M; if so, carrying out step S506; if not, no further process being conducted.

In continuous operation of the touch panel, in order to prevent the noise fluctuation of the display driving circuit from influencing accuracy of touch determination, in charging and scanning touch detection points in the touch panel line by line, it is possible to record scanning numbers for each line; when the scanning numbers reach a preset third threshold value, for example, 30 times, the second noise value is detected once again and updated; and the first threshold value is determined once again according to the first noise value and the updated second noise value.

Based on the same inventive concept, an embodiment of the present invention further provides a touch point detection device. Since the principle for the device to solve problems is similar to that of the aforementioned touch point detection method, implementations for the method may be referred to for implementations of the device and redundant descriptions will not be presented any more.

Figure 6:
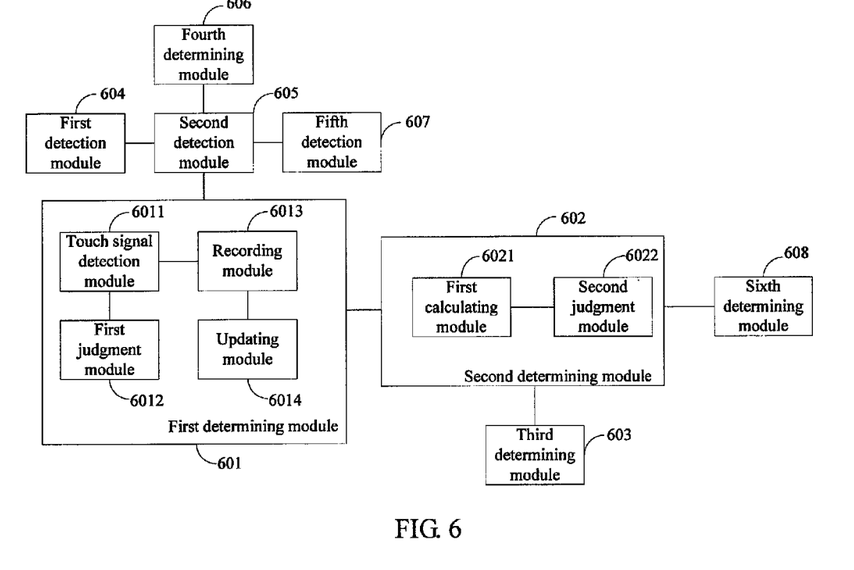
FIG. 6 is a structure diagram of a touch point detection device provided in an embodiment of the present invention.

An embodiment of the present invention provides a touch point detection device as illustrated in FIG. 6, including:

a first determining module 601 configured for determining a to-be-determined touch point among touch detection points of a touch panel;

a second determining module 602 configured for determining whether the to-be-determined touch point is influenced by noise of a display driving circuit according to a touch signal, a first noise value and a second noise value of the touch detection points in the line where the to-be-determined touch point is located; wherein the first noise value is a noise value of the touch driving circuit when the display driving circuit is not turned on, and the second noise value is a noise value of the touch driving circuit when the display driving circuit is turned on;

a third determining module 603 configured for, when determining that the to-be-determined touch point is influenced by the noise of the display driving circuit, determining whether the to-be-determined touch point is a touch point according to the second noise value and a preset first threshold value; the first threshold value being greater than the first noise value and smaller than the second noise value.

Furthermore, the above-mentioned touch point detection device provided in an embodiment of the present invention, as illustrated in FIG. 6, further includes:

a first detection module 604 configured for detecting the first noise value of the touch driving circuit when the display driving circuit is not turned on;

a second detection module 605 configured for, after receiving a synchronization signal sent by the display driving circuit, detecting the second noise value of the touch driving circuit when the display driving circuit is turned on: and a fourth determining module 606 configured for determining a first threshold value according to the first noise value and the second noise value.

Furthermore, the above-mentioned touch point detection device provided in an embodiment of the present invention, as illustrated in FIG. 6, further includes:

a fifth determining module 607 configured for determining a second threshold value according to the second noise value, the second threshold value being greater than the second noise value.

Furthermore, the first determining module 601 in the above-mentioned touch point detection device provided in an embodiment of the present invention, as illustrated in FIG. 6, includes:

a touch signal detection module 6011 configured for charging and scanning the touch detection points of the touch panel line by line and acquiring touch signals for the touch detection points in sequence;

a first judgment module 6012 configured for, as for each touch detection point, determining the magnitude relationship between a touch signal of the touch detection point and a second threshold value; when determining that the touch signal of the touch detection point is greater than the second threshold value, determining the touch detection point to be the to-be-determined touch point.

Furthermore, the first determining module 601 in the above-mentioned touch point detection device provided in an embodiment of the present invention, as illustrated in FIG. 6, further includes:

a recording module 6013 configured for recording scanning numbers of each line when charging and scanning the touch detection points of the touch panel line by line;

an updating module 6014 configured for detecting once again and updating the second noise value when the scanning numbers reach a preset third threshold value; and determining the first threshold value once again according to the first noise value and the updated second noise value.

Furthermore, the second determining module 602 in the above-mentioned touch point detection device provided in an embodiment of the present invention, as illustrated in FIG. 6, includes:

a first calculating module 6021 configured for calculating a weighted average of touch signals of touch detection points other than the to-be-determined touch point and its adjacent touch detection points in the line where the to-be-determined touch point is located;

a second judgment module 6022 configured for determining whether an absolute value of the difference between the weighted average and the second noise value is not greater than the first noise value; if so, determining that the to-be-determined touch point is influenced by the noise of the display driving circuit; if not, determining that the to-be-determined touch point is not influenced by the noise of the display driving circuit.

Furthermore, the third determining module 603 in the above-mentioned touch point detection device provided in an embodiment of the present invention is configured to determine whether an absolute value of the difference between the touch signal for the touch detection point and the second noise value is greater than the first threshold value; if so, determine the to-be-determined touch point to be a touch point and report the touch point.

Furthermore, the above-mentioned touch point detection device provided in an embodiment of the present invention, as illustrated in FIG. 6, further includes:

a sixth determining module 608 configured for, when determining that the to-be-determined touch point is not influenced by noise of the display driving circuit, determining whether the to-be-determined touch point is a touch point according to the first threshold value.

Furthermore, the above-mentioned sixth determining module 608 is configured to determine whether the touch signal for the touch detection point is greater than the first threshold value; if so, determine the to-be-determined touch point to be a touch point and report the touch point.

Based on the same inventive concept, an embodiment of the present invention further provides a touch driving circuit including the above-mentioned touch point detection device provided in an embodiment of the present invention. Since the principle for the circuit to solve problems is similar to that of the aforementioned touch point detection device, implementations for the device may be referred to for implementations of the circuit and redundant description is not presented any more.

Figure 7:
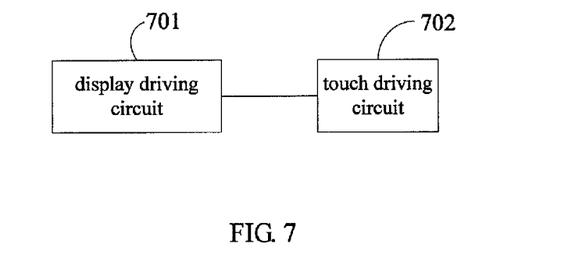
FIG. 7 is a structure diagram of a touch panel provided in an embodiment of the present invention.

Based on the same inventive concept, an embodiment of the present invention further provides a touch panel as illustrated in FIG. 7, including a display driving circuit 701 and a touch driving circuit 702.

The display driving circuit 701 is configured to send a synchronization signal to the touch driving circuit after displaying a set number of frames of images.

The touch driving circuit 702 is configured to detect a first noise value of the touch driving circuit when the display driving circuit is not turned on; after receiving the synchronization signal sent by the display driving circuit, detect a second noise value of the touch driving circuit when the display driving circuit is turned on; determine the to-be-determined touch point among touch detection points of the touch panel; determine whether the to-be-determined touch point is influenced by noise of the display driving circuit according to the touch signal, the first noise value and the second noise value of the touch detection points in the line where the to-be-determined touch point is located; when determining that the to-be-determined touch point is influenced by the noise of the display driving circuit, determining whether the to-be-determined touch point is a touch point according to the second noise value and a preset first threshold value; wherein the first threshold value is greater than the first noise value and smaller than the second noise value.

With the description of the above implementations, those skilled in the art can clearly understand that embodiments of the present invention may be implemented by hardware, or implemented by software plus necessary generic hardware platform. Based on such understanding, the technical solutions of embodiments of the present invention may be implemented in the form of software products that may be stored in a non-volatile storage medium (which may be a CD-ROM, a flash disk, a removable hard disk) including several instructions to enable a computer equipment (which may be a personal computer, a server or a network equipment) to carry out the method described in embodiments of the present invention.

Those skilled in the art can understand that the accompanying drawings are only schematic diagrams of one exemplary embodiment and modules or flows in the figures are not essential for implementing the present invention.

Those skilled in the art can understand that modules in the device of the embodiments may be distributed in the device of the embodiments as described in the embodiments, or may be located in one or more devices different from the present embodiment. The modules in the above-mentioned embodiment may be merged as one module or may be further divided into a plurality of sub-modules.

Reference numbers for the above-mentioned embodiments of the present invention are only for the purpose of description rather than representing any preference.

With the touch point detection method, device, the touch driving circuit and the touch panel provided in the embodiments of the present invention, after determining a to-be-determined touch point among touch detection points of the touch panel, it is determined whether the to-be-determined touch point is influenced by noise of the display driving circuit according to the touch signal, the first noise value and the second noise value of touch detection points in the line where the to-be-determined touch point is located; and after it is determined that the to-be-determined touch point is influenced by the noise of the display driving circuit, it is determined whether the to-be-determined touch point is a touch point according to the second noise value and a preset first threshold value; wherein the second noise value is the noise value of the touch driving circuit when the display driving circuit is turned on. Since it is determined whether the to-be-determined touch point is influenced by the noise of the display driving circuit before determining whether it is a touch point, it is possible to effectively identify interference of the noise on the touch signals, improve signal-to-noise ratio of touch signals, and ensure accuracy of touch determining operation.

What have been described are only exemplary implementations of the present invention, the protection scope of the present invention is not limited thereto. Variations and modifications of embodiments of the present invention that easily occur to those skilled in the art should be encompassed in the protection scope of the present invention. The protection scope of the present invention is defined by the appending claims.

The invention claimed is:

1. A touch point detection method comprising:
   determining a to-be-determined touch point among touch detection points of a touch panel;
   determining whether the to-be-determined touch point is influenced by noise of a display driving circuit according to a touch signal, a first noise value and a second noise value of touch detection points in a line where the to-be-determined touch point is located; wherein the first noise value is a noise value of the touch driving circuit when the display driving circuit is not turned on, and the second noise value is a noise value of the touch driving circuit when the display driving circuit is turned on;
   upon determining that the to-be-determined touch point is influenced by the noise of the display driving circuit, determining whether the to-be-determined touch point is a touch point according to the second noise value and a first threshold value; the first threshold value being greater than the first noise value and smaller than the second noise value.

2. The method of claim 1, wherein before determining of a to-be-determined touch point among touch detection points of the touch panel, the method further comprises:
   detecting the first noise value of the touch driving circuit when the display driving circuit is not turned on;
   after receiving a synchronization signal sent by the display driving circuit, detecting the second noise value of the touch driving circuit when the display driving circuit is turned on; and
   determining the first threshold value according to the first noise value and the second noise value.

3. The method of claim 2, further comprising:
   determining a second threshold value according to the second noise value, the second threshold value being greater than the second noise value.

4. The method of claim 1, wherein determining of a to-be-determined touch point among touch detection points of the touch panel comprises:
   charging and scanning the touch detection points of the touch panel line by line and acquiring touch signals for the touch detection points in sequence;
   for each touch detection point, determining a magnitude relation between a touch signal of the touch detection point and the second threshold value;
   upon determining that the touch signal of the touch detection point is greater than the second threshold value, determining the touch detection point to be the to-be-determined touch point.

5. The method of claim 4, further comprising:
   recording scanning numbers of each line when charging and scanning the touch detection points of the touch panel line by line;
   when the scanning numbers reach a preset third threshold value, detecting once again and updating the second noise value;
   determining the first threshold value once again according to the first noise value and the updated second noise value.

6. The method of claim 1, wherein determining whether the to-be-determined touch point is influenced by the noise of the display driving circuit comprises:
   calculating a weighted average of touch signals of touch detection points other than the to-be-determined touch point and its adjacent touch detection points in the line where the to-be-determined touch point is located;
determining whether an absolute value of difference between the weighted average and the second noise value is not greater than the first noise value;
if so, determining whether the to-be-determined touch point is influenced by the noise of the display driving circuit; and
if not, determining that the to-be-determined touch point is not influenced by the noise of the display driving circuit.

7. The method of claim 1, wherein, upon determining that the to-be-determined touch point is influenced by the noise of the display driving circuit, determining whether the to-be-determined touch point is a touch point comprises:
determining whether an absolute value of difference between the touch signal of the touch detection point and the second noise value is greater than the first threshold value;
if so, determining that the to-be-determined touch point is a touch point and reporting the touch point.

8. The method of claim 1, further comprising:
upon determining that the to-be-determined touch point is not influenced by the noise of the display driving circuit, determining whether the to-be-determined touch point is a touch point according to the first threshold value.

9. The method of claim 8, wherein upon determining that the to-be-determined touch point is not influenced by the noise of the display driving circuit, determining whether the to-be-determined touch point is a touch point comprises:
determining whether the touch signal of the touch detection point is greater than the first threshold value;
if so, determining that the to-be-determined touch point s a touch point and reporting the touch point.

10. A touch point detection device comprising:
a first determining module configured for determining a to-be-determined touch point among touch detection points of a touch panel;
a second determining module configured for determining whether the to-be-determined touch point is influenced by noise of the display driving circuit according to a touch signal, a first noise value and a second noise value of touch detection points in a line where the to-be-determined touch point is located; wherein the first noise value is a noise value of the touch driving circuit when the display driving circuit is not turned on, and the second noise value is a noise value of the touch driving circuit when the display driving circuit is turned on;
a third determining module configured for, upon determining that the to-be-determined touch point is influenced by the noise of the display driving circuit, determining whether the to-be-determined touch point is a touch point according to the second noise value and a first threshold value; the first threshold value being greater than the first noise value and smaller than the second noise value.

11. The device of claim 10, further comprising:
a first detection module configured for detecting the first noise value of the touch driving circuit when the display driving circuit is not turned on;
a second detection module configured for, after receiving a synchronization signal sent by the display driving circuit, detecting the second noise value of the touch driving circuit when the display driving circuit is turned on;
a fourth determining module configured for determining the first threshold value according to the first noise value and the second noise value.

12. The device of claim 10, further comprising:
a fifth determining module configured for determining the second threshold value according to the second noise value, the second threshold value being greater than the second noise value.

13. The device of claim 10, wherein the first determining module comprises:
a touch signal detection module configured for charging and scanning the touch detection points in the touch panel line by line and acquiring touch signals for the touch detection points in sequence;
a first judgment module configured for, for each touch detection point, determining a magnitude relationship between a touch signal of the touch detection point and the second threshold value, and upon determining that the touch signal of the touch detection point is greater than the second threshold value, determining the touch detection point to be the to-be-determined touch point.

14. The device of claim 13, wherein the first determining module further comprises:
a recording module configured for recording scanning numbers of each line when charging and scanning the touch detection points of the touch panel line by line;
an updating module configured for detecting once again and updating the second noise value when the scanning numbers reach a preset third threshold value; and determining the first threshold value once again according to the first noise value and the updated second noise value.

15. The device of claim 10, wherein the second determining module comprises:
a first calculating module configured for calculating a weighted average of touch signals of touch detection points other than the to-be-determined touch point and its adjacent touch detection points in the line where the to-be-determined touch point is located;
a second judgment module configured for determining whether an absolute value of difference between the weighted average and the second noise value is not greater than the first noise value; if so, determining that the to-be-determined touch point is influenced by the noise of the display driving circuit; if not, determining that the to-be-determined touch point is not influenced by the noise of the display driving circuit.

16. The device of claim 10, wherein the third determining module is configured to determine whether an absolute value of difference between the touch signal of the touch detection point and the second noise value is greater than the first threshold value; if so, determine the to-be-determined touch point to be a touch point and report the touch point.

17. The device of claim 10, further comprising:
a sixth determining module configured for, upon determining that the to-be-determined touch point is not influenced by the noise of the display driving circuit, determining whether the to-be-determined touch point is a touch point according to the first threshold value.

18. The device of claim 17, wherein the sixth determining module is configured to determine whether the touch signal for the touch detection point is greater than the first threshold value; if so, determine the to-be-determined touch point to be a touch point and report the touch point.

19. A touch driving circuit comprising the touch point detection device of claim 10.

20. A touch panel comprising: a display driving circuit and a touch driving circuit wherein the display driving circuit is configured to send a synchronization signal to the touch driving circuit after displaying a set number of frames of images;

the touch driving circuit is configured to detect a first noise value of the touch driving circuit when the display driving circuit is not turned on; after receiving the synchronization signal sent by the display driving circuit, detect a second noise value of the touch driving circuit when the display driving circuit is turned on; determine a to-be-determined touch point among touch detection points of the touch panel; determine whether the to-be-determined touch point is influenced by noise of the display driving circuit according to a touch signal, a first noise value and a second noise value of the touch detection points in a line where the to-be-determined touch point is located; upon determining that the to-be-determined touch point is influenced by the noise of the display driving circuit, determine whether the to-be-determined touch point is a touch point according to the second noise value and a first threshold value;

wherein the first threshold value is greater than the first noise value and smaller than the second noise value.

* * * * *